Dec. 1, 1970  V. H. SANTINI  3,543,419
EDUCATIONAL DEVICE INTENDED TO STIMULATE FOREIGN
LANGUAGE LEARNING AND AWARENESS TO
LANGUAGE RELATIONSHIP
Filed Aug. 26, 1968

*INVENTOR.*
VICTOR H. SANTINI

United States Patent Office 3,543,419
Patented Dec. 1, 1970

3,543,419
EDUCATIONAL DEVICE INTENDED TO STIMULATE FOREIGN LANGUAGE LEARNING AND AWARENESS TO LANGUAGE RELATIONSHIP
Victor H. Santini, 1413 W. Lake St.,
Fort Collins, Colo. 80521
Filed Aug. 26, 1968, Ser. No. 755,277
Int. Cl. G09b 1/20
U.S. Cl. 35—77        1 Claim

ABSTRACT OF THE DISCLOSURE

A language teaching apparatus in which comb-like members having T-shaped teeth are supported in a frame and rotatably support triangular prisms. Each side of a prism contains a different foreign equivalent of an English word as well as the pronunciation.

---

The purpose of this device is to acquaint a large number of people with the basic vocabulary of three languages in a pleasant and stimulating way. It is, therefore, an educational device designed to provide cultural improvement to its users.

Figure 1:
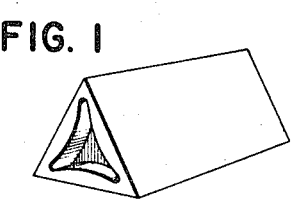
Figure 2:

The device is composed of a plurality of basic elements: i.e., a triangular equilateral prism (FIG. 1), exhibiting on each of its three faces the same vocabulary word in three given foreign languages of which the English equivalent must be guessed. Its faces appear in three contrasting colors; each color distinguishing the language background of the word printed on it (FIG. 2).

Figure 5:
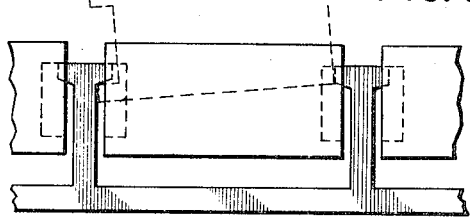
Figure 3:
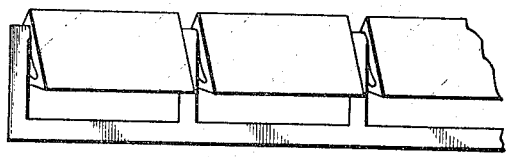
Figure 4:
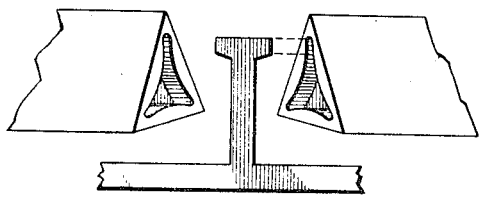

Each prism can rotate manually, as it is hinged on two pivots (FIGS. 3 and 4), from which it can be disengaged at will by lifting on one side (FIG. 5), it also assumes a position of rest, after turning, thanks to a three-lobed cavity opened at the sides of the prism itself which allows the pivots to slide upward (FIGS. 3 and 4). Each prism is part of a larger assembly, namely a plurality of parallel alignments fitted onto a main frame (FIGS. 6 and 7).

Figure 6:
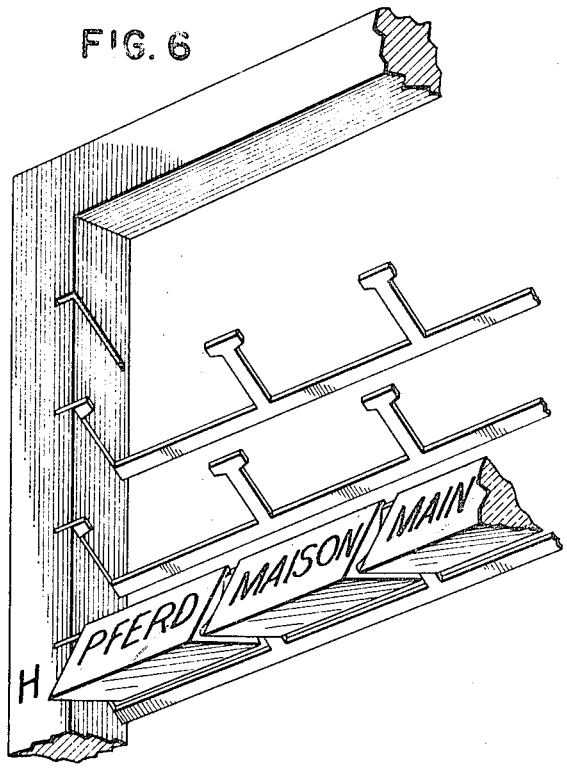

Each prism alignment is assured by an alignment of pivots; the pivots are made in the shape of a T (FIG. 4), at the tip of the teeth of a comb-like support which, in turn, rests with its sides on convenient slots opened at equal spaces on the inner vertical sides of the main frame (FIG. 6).

Figure 7:
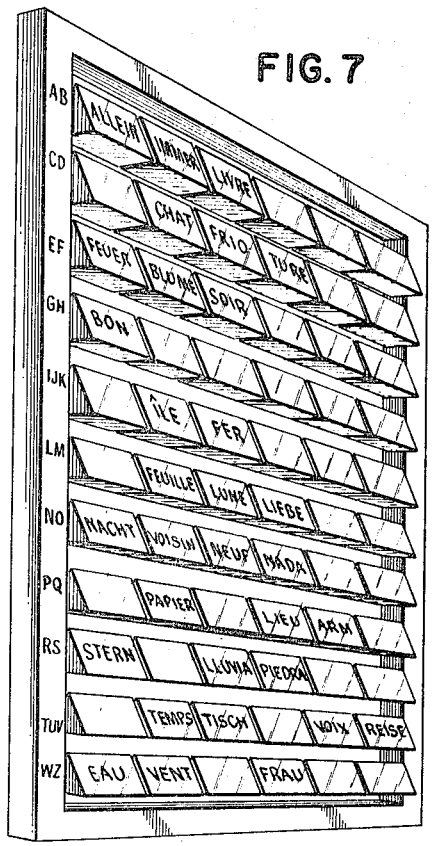

The main frame preferably has a rectangular shape as shown in FIG. 7, although other shapes may be used, and exhibits on its left front side, beside each aligned row of prisms, a letter of the English alphabet; this letter represents a help, a cue, given to the user of the device to ease his identification problem, namely: the first letter of the equivalent English word to be found (FIG. 7). Under each foreign word, the approximate phonetic pronunciation will appear in small letters (FIG. 2).

With this device the learning of foreign words becomes a game. The device itself provides the initial stimulation of curiosity which is supplemented by a process of deductive judgement and finally by memorization.

The user of this device is helped in his guessing by rotating the prism and looking at the three foreign words (some may have an English cognate), and also by the first letter of the English word which appears at the left. For instance: on an H row, there coud be a prism with the word Cheval, Pferd, and Caballo (if the three languages in question happen to be French, German and Spanish), which is the English word Horse. Also, in the H row, one could find the word Maison, Haus, and Casa, meaning House; whereas: Chien, Hund and Perro would appear in the D row for Dog.

Learning foreign words within this device affords also the intellectual advantage of becoming aware of a certain relation existing between them and their English equivalent, in terms of spelling, root development and origin; this feature adds relief, dynamism and satisfaction to whatever mechanical element found with the game.

This device is supposed to be best manufactured in plastic material, although other material could be suitable.

I claim:
1. An educational device aiming at teaching basic vocabulary in three given foreign languages by the use of rotatable, triangular, equilateral prisms, said prisms exhibiting, individually, the equivalent of an English word in three languages as well as, in smaller print, their approximate pronunciation, upon the same color background for each language considered, said prisms being kept aligned in parallel rows by an alignment of pivots stemming, in a T shape, from the tip of the teeth of a plurality of comb-like supports that rest on convenient slots opened at regular intervals on the inner, vertical sides of a comprehensive frame, said prisms offering a three-lobed cavity on each side which allows the pivots to slide upward after each rotation, thus assuring their alignment by gravity, said prisms being removable at will from their pivots by lifting them on one side, said prisms distinguished, row by row, by a letter of the English alphabet showing on one side of the main frame.

References Cited

UNITED STATES PATENTS 1,889,976  12/1932  Comins _____ 35—27
2,462,857  8/1969   Glass et al. _____ 37—77

FOREIGN PATENTS 503,229  12/1954  Italy.

HARLAND S. SKOGQUIST, Primary Examiner

U.S. Cl. X.R.

35—35